(12) United States Patent
Bruhn et al.

(10) Patent No.: US 7,303,722 B2
(45) Date of Patent: Dec. 4, 2007

(54) METHOD OF MAKING TOOLS OR COMPONENTS

(75) Inventors: Johnny Bruhn, Västerafämebo (SE); Evert Löwdin, Fagersta (SE); Tomas Rostwall, Stockholm (SE)

(73) Assignee: Seco Tools AB, Fagersta (SE)

( * ) Notice: Subject to any disclaimer, the term of this patent is extended or adjusted under 35 U.S.C. 154(b) by 459 days.

(21) Appl. No.: 10/924,857

(22) Filed: Aug. 25, 2004

(65) Prior Publication Data

US 2005/0133972 A1   Jun. 23, 2005

(30) Foreign Application Priority Data

Aug. 27, 2003   (SE) ................ 0302315-7

(51) Int. Cl.
*C04B 33/32*   (2006.01)
*B23B 27/00*   (2006.01)

(52) U.S. Cl. .............. 264/645; 264/638; 264/656; 264/681

(58) Field of Classification Search .......... 264/125, 264/681, 645, 638, 604, 656; 419/36–37
See application file for complete search history.

(56) References Cited

U.S. PATENT DOCUMENTS

| | | | | |
|---|---|---|---|---|
| 4,478,888 A | * | 10/1984 | Benjamin et al. ............ 427/220 |
| 4,684,405 A | * | 8/1987 | Kolaska et al. ................ 75/240 |
| 4,902,471 A | * | 2/1990 | Penkunas et al. .............. 419/33 |
| 4,963,183 A | * | 10/1990 | Hong ............................ 75/241 |
| 5,194,203 A | * | 3/1993 | Kankawa et al. ........... 264/125 |
| 5,288,676 A | * | 2/1994 | Shimada et al. ............... 501/93 |
| 5,419,857 A | | 5/1995 | Van den Sype |
| 5,531,958 A | | 7/1996 | Krueger |
| 5,580,666 A | * | 12/1996 | Dubensky et al. ........... 428/552 |
| 5,627,258 A | * | 5/1997 | Takayama et al. ........... 528/338 |
| 5,746,960 A | | 5/1998 | Yoshikawa et al. |
| 5,809,848 A | * | 9/1998 | Viswanadham et al. ...... 76/112 |
| 6,051,184 A | * | 4/2000 | Kankawa ..................... 419/36 |
| 6,368,377 B1 | * | 4/2002 | Bryant et al. ................. 75/240 |
| 2005/0200054 A1 | | 9/2005 | Puide |

FOREIGN PATENT DOCUMENTS

| | | |
|---|---|---|
| EP | 0 501 602 B1 | 4/1998 |
| WO | WO98/18973 | * 5/1998 |

\* cited by examiner

*Primary Examiner*—Carlos Lopez
(74) *Attorney, Agent, or Firm*—Drinker Biddle & Reath LLP

(57) ABSTRACT

The present invention relates to a method of making a sintered body comprising one or more hard constituents in a binder phase by injection molding or extrusion. According to the invention, the binder system comprises 30-70 wt % poly(ethylene-co-vinylacetate) and balance (Polyethylene)-blend-(Poly(oxy-1,2-ethanediyl), .alpha.-hydro-.omega.-hydroxy)-based wax. The solids loading of the feedstock, $\gamma$, is $0.51<\gamma<0.53$, calculated using the equation:

$$\gamma = \frac{\rho_f - \rho_b}{\rho_s - \rho_b}$$

where
  $\rho_s$ is the density of the material as sintered,
  $\rho_b$ is the density of the binder system and
  $\rho_f$ is the density of the feedstock, measured with a helium pycnometer.
Debinding is performed by heating in a furnace in flowing hydrogen atmosphere.

11 Claims, 1 Drawing Sheet

METHOD OF MAKING TOOLS OR COMPONENTS

BACKGROUND OF THE INVENTION

The present invention relates to a method for the production of hard metal tools or components using the powder injection molding or extrusion method.

Hard metals are composites consisting of small (μm-scale) grains of at least one hard phase in a binder phase. In the case of tungsten carbide based hard metals, these materials always contain the hard phase tungsten carbide (WC). In addition, other metal carbides with the general composition (Ti,Nb,Ta,W)C may also be included, as well as metal carbonitrides, e.g., Ti(C,N). The binder phase composition may be Co, Ni, and Fe, or combinations thereof. Co is preferred.

Titanium carbonitride based hard metals do not contain the tungsten carbide phase, i.e. WC.

Industrial production of hard metals often includes blending of given proportions of powders of raw materials and additives in the wet state using a milling liquid. This liquid is often an alcohol, e.g., ethanol, or water, or a mixture thereof. The mixture is then milled into a homogeneous slurry. The wet milling operation is made with the purpose of deagglomeration and mixing the raw materials intimately. Individual raw material grains are also disintegrated to some extent. The obtained slurry is then dried and granulated, e.g. by means of a spray drier. The granulate thus obtained may then be used in uniaxial pressing of green bodies or for extrusion or injection molding.

Injection molding is common in the plastics industry, where material containing thermoplastics or thermosetting polymers are heated and forced into a mold with the desired shape. The method is often referred to as Powder Injection Molding (PIM) when used in powder technology. It is preferably used for parts with complex geometry.

In powder injection molding, four consecutive steps are applied:

1. Mixing of the granulated powder with a binder system. The binder system acts as a vehicle for the powder and constitutes 25-55 volume % of the resulting material, often referred to as the feedstock. The exact concentration is dependent on the desired process properties during molding. The mixing is made with the binder system in molten state. The resulting feedstock is obtained as pellets of approximate size 4×4 mm.

2. Injection molding is performed using the mixed feedstock. The material is heated to 100-240° C. and then forced into a cavity with the desired shape. The thus obtained part is cooled and then removed from the cavity.

3. Removing the binder from the obtained part. The removal can be obtained by wet extraction of the parts and/or by heating in a furnace with a suitable atmosphere. This step is often referred to as the debinding step.

4. Sintering of the parts. Common sintering procedures for hard metals are applied.

Extrusion of the feedstock comprises steps 1, 3 and 4 above. Instead of forcing the feedstock into a cavity of the desired shape, the feedstock is continuously forced through a die with the desired cross section.

EP-A-963454 (WO 98/18973) discloses a method of making a sintered body comprising one or more hard constituents in a binder phase by injection molding technique comprising wet milling of a powder mixture containing powders forming the hard constituents and binder phase, drying said milled powder mixture, mixing said powder mixture with organic binder, waxes and surfactant into a feedstock, molding the feedstock into bodies of desired shape in a conventional plastic injection molding machine, debinding said body and sintering. If the surfactant is introduced already during the milling operation, the level of porosity in the body is significantly reduced.

OBJECTS AND SUMMARY OF THE INVENTION

It is an object of the present invention to provide a method to produce a material that easily can be injection molded or extruded and at the same time easily be debound without the appearance of cracks.

In accordance with the present invention, there is provided a method of making a sintered body comprising one or more hard constituents in a binder phase by injection molding or extrusion technique comprising mixing by wet milling of powders forming the hard constituents and binder phase with stearic acid to form a slurry, drying the slurry formed into a powder, mixing the powder with a binder system comprising 30-70 wt % poly(ethylene-co-vinylacetate), balance a (Polyethylene)-blend-(Poly(oxy-1,2-ethanediyl), .alpha.-hydro-.omega.-hydroxy)-based wax, into a feedstock with a solids loading of $0.51<\gamma<0.53$, calculated using the equation:

$$\gamma = \frac{\rho_f - \rho_b}{\rho_s - \rho_b}$$

where $\rho_s$ is the density of the material as sintered, $\rho_b$ is the density of the binder system and $\rho_f$ is the density of the feedstock, measured with a helium pycnometer and molding said feedstock into a body of desired shape in an injection molding machine or extruder, debinding of the obtained body by heating in a furnace in flowing hydrogen and sintering.

DETAILED DESCRIPTION OF THE PREFERRED EMBODIMENTS OF THE INVENTION

Figure 1:
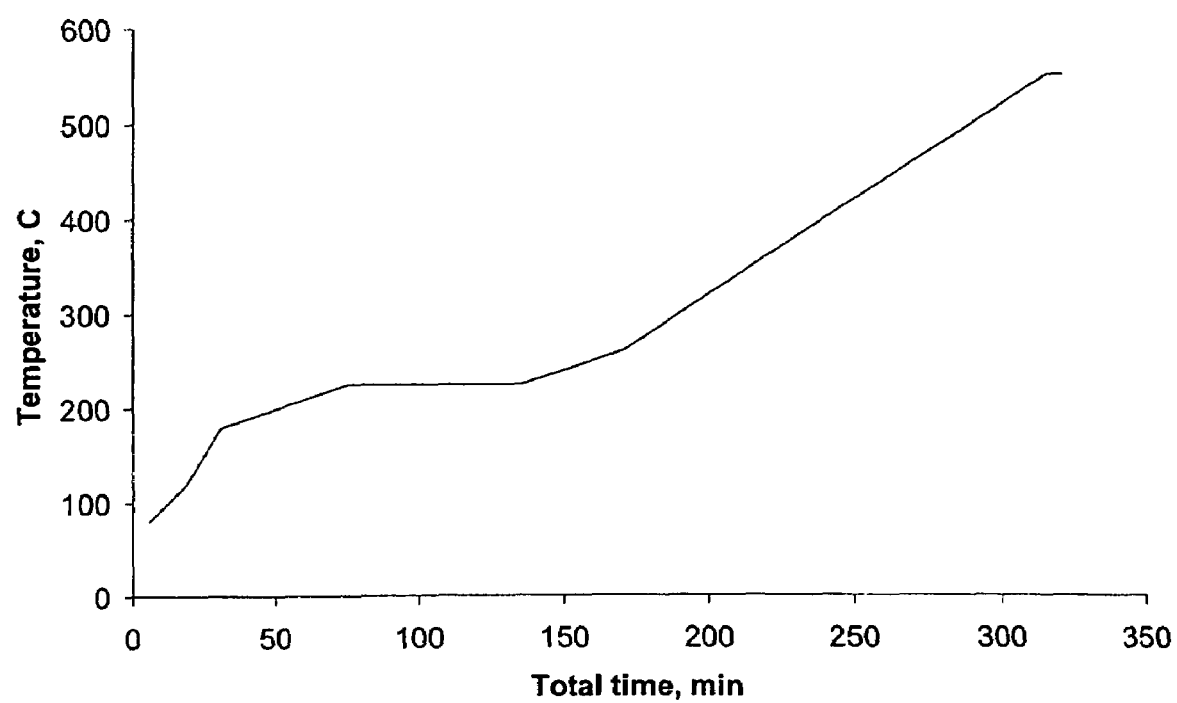
FIG. 1 shows a debinding curve for a binder system of the present invention.

It has now surprisingly been found that by using a binder system of poly(ethylene-co-vinylacetate) and (Polyethylene)-blend-(Poly(oxy-1,2-ethanediyl), .alpha.-hydro-.omega.-hydroxy)-based wax in a certain ratio, compounded to a certain solids loading, parts can easily be injection molded or extruded, debound and sintered to produce crack free parts.

An example of a (Polyethylene)-blend-(Poly(oxy-1,2-ethanediyl), .alpha.-hydro.omega.-hydroxy)-based wax is the commercially available Licomont EK583 from Clariant. Similarly acting binder materials may also be used.

The method according to the present invention comprises the following steps

1. Wet milling of the raw materials in water, or alcohol, or a combination thereof, preferably 80 wt % ethanol and 20 wt % water, together with 0.4-0.8 wt %, preferably 0.5-0.7 wt % stearic acid as a granulating agent for the subsequent spray drying. The smaller the grain size of the hard constituent, the more stearic acid is required. The wet milling of these materials results in a slurry of the raw materials in the water and/or alcohol.

2. Drying of the slurry formed during the above-mentioned wet milling process step.

3. Mixing the dried powder by kneading with a binder system of 30-70 wt % poly(ethylene-co-vinylacetate), preferably 40-60 wt % and balance (Polyethylene)-blend-(Poly(oxy-1,2-ethanediyl), .alpha.-hydro-.omega.-hydroxy)-based wax. The mixing is performed in a twin screw extruder, heated to 50-200° C., that forms pellets with a size of approximately 4×4 mm. The solids loading of the feedstock, γ, shall be 0.51<γ<0.53, calculated using the following equation:

$$\gamma = \frac{\rho_f - \rho_b}{\rho_s - \rho_b}$$

where
$\rho_s$ is the density of the material as sintered,
$\rho_b$ is the density of the binder system and
$\rho_f$ is the density of the feedstock, measured with a helium pycnometer.

4. Injection molding of the feedstock in an injection molding machine. Alternatively, the feedstock is extruded in a single screw, twin screw or piston type extruder. The material is heated to 100-240° C., preferably 140-160° C., and then, in the case of injection molding, forced into a cavity with the desired shape. If extrusion is used, the material is forced through a tool with the desired cross section. The part obtained in injection molding is cooled and then removed from the cavity. The extrudates are cut in pieces of desired length.

5. Debinding of the obtained part by heating in a furnace, preferably in flowing hydrogen atmosphere at atmospheric pressure up to 600° C. The debinding is an crucial step including several ramps and soak times, depending of the size of the part in order to avoid the formation of cracks and other defects. An example of the temperature profile for debinding of a part of about 17 g is shown in FIG. 1. It is within the purview of the skilled artisan to determine by experiments the conditions necessary to avoid the formation of cracks and other defects according to this specification.

6. Presintering of the part in the debinding furnace in vacuum at 900-1250° C., preferably at about 1200° C.

7. Sintering of the parts using conventional sintering technique, preferably in a sinter-HIP furnace.

The invention can be used for all compositions of cemented carbide and all WC grain sizes commonly used as well as for titanium carbonitride based materials.

In one embodiment, the grain size shall be 0.2-1.5 µm with conventional grain growth inhibitors. In another embodiment, the grain size shall be 1.5-4 µm.

The invention is additionally illustrated in connection with the following Examples, which are to be considered as illustrative of the present invention. It should be understood, however, that the invention is not limited to the specific details of the Examples.

EXAMPLE 1

A WC-10 wt % Co submicron cemented carbide powder was made by wet milling 35.00 kg Co-powder (OMG extra fine), 1.743 kg $Cr_3C_2$ (H C Starck), 313.1 kg WC (H C Starck DS80), 0.257 kg carbon black and 2.1 kg stearic acid in 120 l milling liquid of ethanol and water (80:20 by weight) for 40 h. The resulting slurry was spraydried to a granulated powder.

EXAMPLE 2 COMPARATIVE

The powder made in Example 1 was mixed by kneading 47.32 kg powder from Example 1 with 1.34 kg poly(ethylene-co-vinylacetate) (ExxonMobil Escorene Ultra UL 00728) and 1.34 kg Licomont EK 583 (Clariant) in a twin screw extruder (Werner & Pfleiderer ZSK 25). This resulted in a feedstock with a density of 8.41 g/cm³, corresponding to γ=0.550.

EXAMPLE 3

Comparative

The powder made in Example 1 was mixed by kneading 46.77 kg powder from Example 1 with 1.615 kg poly(ethylene-co-vinylacetate) (ExxonMobil Escorene Ultra UL 00728) and 1.615 kg Licomont EK 583 Clariant) in a twin screw extruder (Werner & Pfleiderer ZSK 25). This resulted in a feedstock with a density of 7.74 g/cm³, corresponding to γ=0.500.

EXAMPLE 4 INVENTION

The powder made in Example 1 was mixed by kneading 47.02 kg powder from Example 1 with 1.49 kg poly(ethylene-co-vinylacetate) (ExxonMobil Escorene Ultra UL 00728) and 1.49 kg Licomont EK 583 (Clariant) in a twin screw extruder (Werner & Pfleiderer ZSK 25). This resulted in a feedstock with a density of 8.03 g/cm³, corresponding to γ=0.522.

EXAMPLE 5

The feedstocks produced in the Examples 2-4 were injection molded in an injection molding machine (Arburg 320S) at 155° C. of the feedstock and 55° C. of the mold. The geometry of the mold was a Seco Tools Minimaster with three flutes, diameter 10 mm after sintering.

The feedstock of Example 2 was so viscous that the injection molding machine could not produce acceptable parts. The remaining feedstocks gave parts with the desired shape.

EXAMPLE 6

The feedstocks produced in the Examples 2-4 were extruded with a Werner & Pfleiderer ZSK 25 at 140° C. of the feedstock and 90° C. of the die. The cross section of the die was a diameter 6 mm rod as sintered. The extrudates were cut in lengths of 85 mm.

The feedstock of Example 2 was so viscous that the extruder could not produce extrudates due to a too high material pressure.

EXAMPLE 7

The injection molded and extruded parts from Example 5 and 6 with feedstocks from Examples 3 and 4 were debound in a debinding furnace (Vacuum Industries Injectavac 50) in flowing hydrogen according to the temperature profile in FIG. 1. The gas flow rate was 50 standard dm$^3$ per minute up to 600° C. at which temperature the atmosphere was shifted to vacuum and the temperature was raised to 1200° C. The parts were presintered at that temperature with a soaking time of 10 minutes after which the power of the furnace was shut off.

After presintering, the parts were sintered in a Sinter-HIP furnace (PVA COD733R) at 1420° C. with a total soaking time of 60 min. After 30 min at the peak hold temperature, the furnace pressure was raised to 3 MPa Ar.

After sintering, the parts were cut for inspection. The parts produced from the feedstock according to Example 3 had cracks at the center while those produced from the feedstock according to Example 4 were free from cracks and pores. This demonstrates that the solids loading, $\gamma$, is of outermost importance for the quality of the injection molded and extruded parts.

The described embodiments of the present invention are intended to be illustrative rather than restrictive, and are not intended to represent every possible embodiment of the present invention. Various modifications can be made to the disclosed embodiments without departing form the spirit or scope of the invention as set forth in the following claims, both literally and in equivalents recognized by law.

What is claimed is:

1. A method of making a sintered body comprising one or more hard constituents in a binder phase by injection molding or extrusion technique comprising
    mixing by wet milling of powders forming the hard constituents and binder phase with stearic acid to form a slurry,
    drying the slurry formed into a powder,
    mixing the powder with a binder system comprising 30-70 wt % poly(ethylene-co-vinylacetate), balance (Polyethylene)-blend-(Poly(oxy-1,2-ethanediyl)-alpha-hydro-omega-hydroxy)-based wax, into a feedstock with a solids loading of 0.51 <$\gamma$<0.53, calculated using the equation:

$$\gamma = \frac{\rho_f - \rho_b}{\rho_s - \rho_b}$$

where
    $\rho_s$ is the density of the material as sintered,
    $\rho_b$ is the density of the binder system and
    $\rho_f$ is the density of the feedstock, measured with a helium pycnometer,
    molding said feedstock into a body of desired shape in an injection molding machine or extruder,
    debinding of the obtained body by heating in a furnace in flowing hydrogen, and
    sintering.

2. The method of claim 1, wherein the binder system comprises 40 to 60 wt % poly(ethylene-co-vinylacetate).

3. The method of claim 2, wherein said sintered body is a cemented carbide.

4. The method of claim 3, wherein said cemented carbide is submicron sized.

5. The method of claim 3, wherein said cemented carbide has an average grain size of 1.5-4 μm.

6. The method of claim 1, wherein said drying of the slurry is performed by spray drying.

7. The method of claim 1, wherein said debinding is made at a temperature up to 600° C.

8. The method of claim 1, wherein said body is presintered after debinding and before sintering.

9. The method of claim 7, wherein said presintering is carried out at a temperature of 900-1250° C.

10. The method of claim 1, wherein said sintering is made by sinterhipping.

11. The method of claim 9, wherein said presintering is carried out at a temperature of about 1200° C.

* * * * *